US012444218B2

United States Patent
Wang

(10) Patent No.: US 12,444,218 B2
(45) Date of Patent: Oct. 14, 2025

(54) IMAGE PROCESSING METHOD AND APPARATUS FOR ESTABLISHING WIRELESS CONNECTION BETWEEN DEVICES

(71) Applicant: VIVO MOBILE COMMUNICATION CO., LTD., Dongguan (CN)

(72) Inventor: Heyan Wang, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 294 days.

(21) Appl. No.: 18/119,816

(22) Filed: Mar. 9, 2023

(65) Prior Publication Data
US 2023/0215200 A1    Jul. 6, 2023

Related U.S. Application Data

(63) Continuation of application No. PCT/CN2021/117243, filed on Sep. 8, 2021.

(30) Foreign Application Priority Data

Sep. 10, 2020    (CN) .......................... 202010948810.5

(51) Int. Cl.
*G06V 30/148*    (2022.01)
*G06V 10/22*    (2022.01)

(52) U.S. Cl.
CPC .......... *G06V 30/153* (2022.01); *G06V 10/225* (2022.01)

(58) Field of Classification Search
None
See application file for complete search history.

(56) References Cited

U.S. PATENT DOCUMENTS

2019/0189127 A1*    6/2019    Choi ....................... G10L 15/22
2020/0097692 A1*    3/2020    Tu ..................... G06K 19/06037

FOREIGN PATENT DOCUMENTS

| CN | 103685206 A |   | 3/2014 |
| CN | 106231104 A | * | 12/2016 |
| CN | 111598096 A |   | 8/2020 |
| CN | 112148124 A |   | 12/2020 |
| EP | 3493110 A1 |   | 6/2019 |

OTHER PUBLICATIONS

International Search Report issued in corresponding International Application No. PCT/CN2021/117243, mailed Nov. 25, 2021, 4 pages.

* cited by examiner

*Primary Examiner* — Andrew H Lam
(74) *Attorney, Agent, or Firm* — IPX PLLC

(57) ABSTRACT

An image processing method and apparatus are provided. The method includes: acquiring a target image. The target image is an image obtained by capturing a dynamic image displayed by a first device by means of a second device. The dynamic image is used for indicating configuration information of the first device. The first device has a first attitude. The methods further includes identifying a primary graphic body of a first graphic and a secondary graphic body of the first graphic. The first graphic is a graphic in the target image. The method also includes determining a first character corresponding to the first graphic and identifying the first device based on the first character.

15 Claims, 7 Drawing Sheets

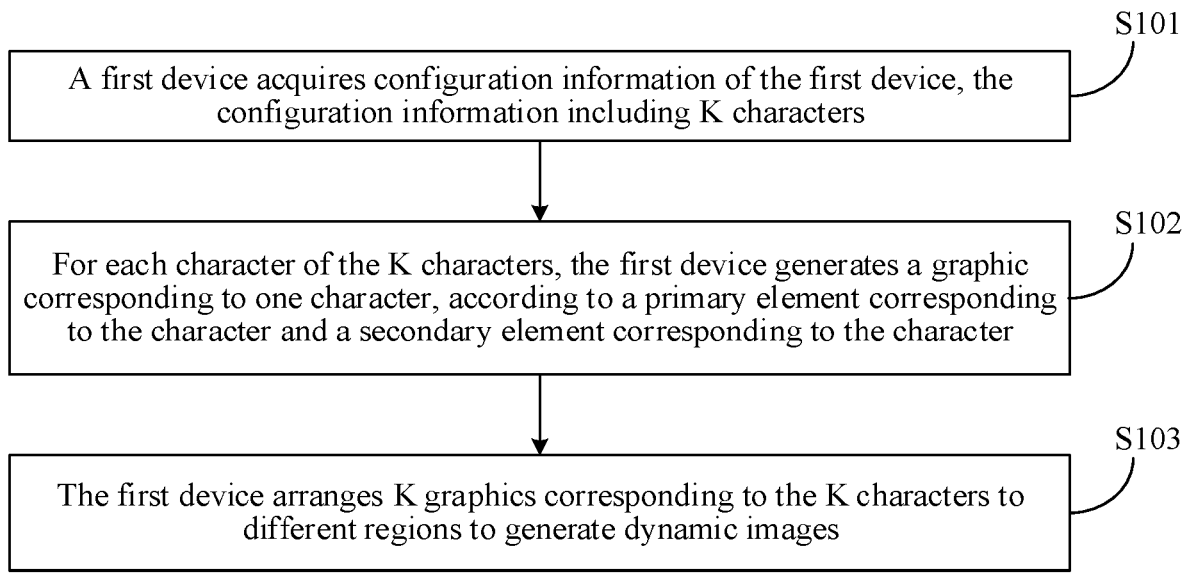
FIG. 1
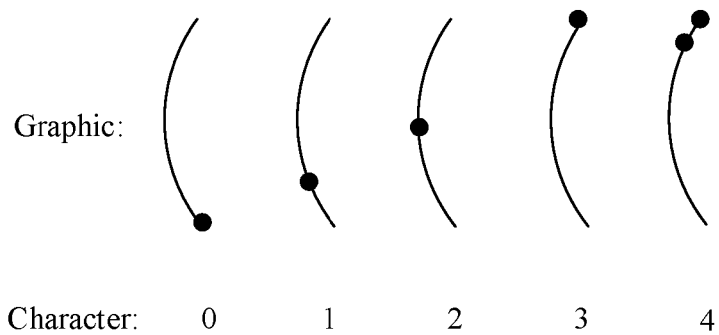
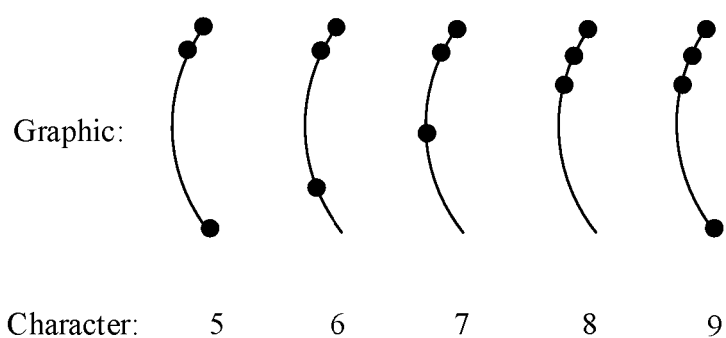
FIG. 2

Strings: 168-156-237-125-204-158

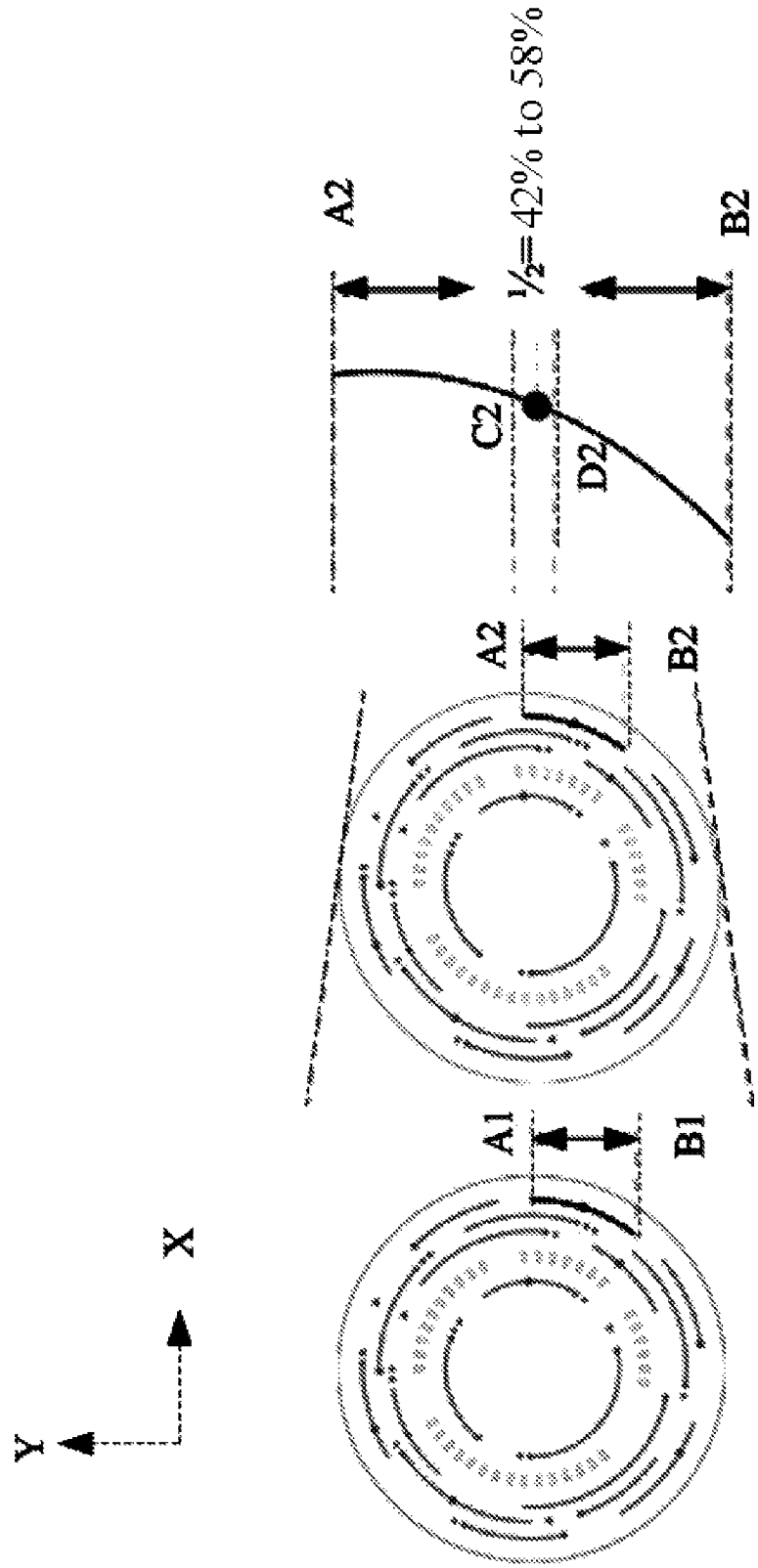

IMAGE PROCESSING METHOD AND APPARATUS FOR ESTABLISHING WIRELESS CONNECTION BETWEEN DEVICES

CROSS-REFERENCE TO RELATED APPLICATIONS

The present application is a continuation of International Application No. PCT/CN2021/117243, filed on Sep. 8, 2021, which claims the priority of the Chinese Patent Application No. 202010948810.5 filed on Sep. 10, 2020. The entire contents of each of the above-referenced applications are expressly incorporated herein by reference.

TECHNICAL FIELD

Embodiments of the present application relates to the technical field of communications, and in particular relates to an image processing method and apparatus and an electronic device.

BACKGROUND

With rapid development of a communication technology, a wireless connection can be established between multiple devices. For example, the wireless connection can be established between smart wearable devices such as a smart bracelet and a smart watch and a mobile phone, and data is transmitted therebetween.

Generally, the device can be identified with identity information such as a Media Access Control (MAC) address. When a user intends to establish the wireless connection between two devices, a device 1 can be triggered by the user to generate and display an identity image, and the identity image is scanned by using a device 2, so that the device 2 can read the identity information of the device 1 from the identity image. After the wireless connection is established between the device 1 and the device 2, various types of data can be transmitted therebetween.

However, in the process of scanning the identity image displayed by the device 1 by using the device 2, since the device 1 may shake, for example, the smart watch will shake with the movement of the user's arm, an angle of an identity image collected by the device 2 will change, thereby resulting in that the identity image cannot be identified, and therefor the identity information of the device cannot be read.

SUMMARY

The present application provides an image processing method and apparatus and an electronic device.

The present application is implemented as follows:

In a first aspect, an embodiment of the present application provides an image processing method. The method includes: acquiring a target image, the target image being an image obtained by capturing a dynamic image displayed by a first device by means of a second device, the dynamic image being used for indicating configuration information of the first device, and the first device having a first attitude; identifying a primary graphic body of a first graphic and a secondary graphic body of the first graphic, the first graphic being a graphic in the target image; determining a first character corresponding to the first graphic, in a case that a position of the secondary graphic body of the first graphic on the primary graphic body of the first graphic falls within a first preset range, the first preset range corresponding to the first attitude; and identifying the first device based on the first character.

In a second aspect, an embodiment of the present application provides an image processing apparatus. The image processing apparatus includes an acquisition module, an identification module and a determination module. The acquisition module is configured to acquire a target image, the target image being an image obtained by capturing a dynamic image displayed by a first device by means of a second device, the dynamic image being used for indicating configuration information of the first device, and the first device having a first attitude. The identification module is configured to identify a primary graphic body of a first graphic and a secondary graphic body of the first graphic, the first graphic being a graphic in the target image acquired by the acquisition module. The determination module is configured to determine a first character corresponding to the first graphic, in a case that a position of the secondary graphic body of the first graphic on the primary graphic body of the first graphic falls within a first preset range, the first preset range corresponding to the first attitude. The identification module is further configured to identify the first device based on the first character determined by the determination module.

In a third aspect, an embodiment of the present application provides an electronic device, the electronic device including a processor, a memory and a program or instruction stored on the memory and executable on the processor. When the program or instruction is executed by the processor, the steps of the method as provided in the first aspect are implemented.

In a fourth aspect, an embodiment of the present application provides a readable storage medium on which a program or instruction is stored. When the program or instruction is executed by the processor, the steps of the method as provided in the first aspect are implemented.

In a fifth aspect, an embodiment of the present application provides a chip, the chip including a processor and a communication interface. The communication interface is coupled with the processor. The processor is configured to run the program or instruction to implement the method as provided in the first aspect.

BRIEF DESCRIPTION OF THE DRAWINGS

FIG. 1 is a schematic diagram of an image generating method provided by an embodiment of the present application;

FIG. 2 is a schematic diagram of a character and graphic provided by an embodiment of the present application;

FIGS. 7a-7c each is a schematic diagram of determining a character according to a target image provided by an embodiment of the present application;

DETAILED DESCRIPTION

Figure 3:
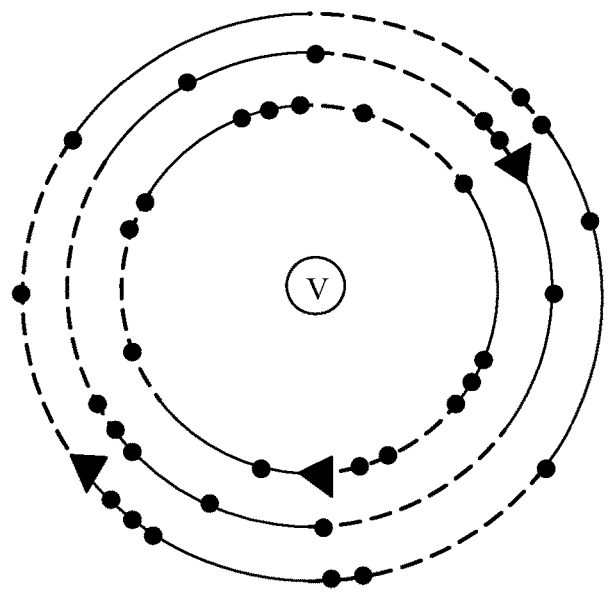
FIG. 3 is a schematic diagram of a dynamic image provided by an embodiment of the present application.

The embodiments of the present application will be described in combination with the accompanying drawings in the embodiments of the present application. Obviously, the described embodiments are only part of the embodiments of the present application, but not all embodiments. Based on the embodiments in the present application, all other embodiments obtained by those of ordinary skill in the art without creative work fall within the protection scope of the present application.

The terms "first" and "second" in DESCRIPTION and CLAIMS of the present application are used to distinguish similar objects, but not to describe a specific order or sequence. It should be understood that data used in this way can be interchanged where appropriate, so that the embodiments of the present application can be implemented in order other than those illustrated or described here, and the objects distinguished by "first", "second" and so on are usually of one type, without limiting the number of the objects, for example, the first object can be one or more. In addition, "and/or" in DESCRIPTION and CLAIMS indicates at least one of the connected objects, and the character "/" generally indicates that the associated objects show an "or" relationship.

An embodiment of the present application provides an image generating method, an image processing method, an image processing apparatus and an electronic device, which can acquire a target image, the target image being an image obtained by capturing a dynamic image displayed by a first device by means of a second device, the dynamic image being used for indicating configuration information of the first device, and the first device having a first attitude; a primary graphic body of a first graphic and a secondary graphic body of the first graphic are identified, the first graphic being a graphic in the target image; a first character corresponding to the first graphic is determined, in a case that a position of the secondary graphic body of the first graphic on the primary graphic body of the first graphic falls within a first preset range, the first preset range corresponding to the first attitude; and the first device is identified based on the first character. In a case that the first device displays the dynamic image, although the angle of the target image obtained by capturing the dynamic image by the second device will change with the change of the attitude of the first device, when the position of the secondary graphic body of the first graphic in the target image on the primary graphic body falls within the first preset range corresponding to the first attitude, the first character corresponding to the first graphic can still be determined, and the first device is identified based on the first character. Therefore, the identity of the scanned device can be identified in a case that the scanned device shakes in this embodiment of the present application.

The image generating method, image processing method, image processing apparatus and electronic device provided by this embodiment of the present application will be described in detail through specific embodiments and application scenarios in combination with the accompanying drawings.

EMBODIMENT I

As shown in FIG. 1, an embodiment of the present application provides an image generating method. The method can be applied to the first device, also referred to as the scanned device, such as a smart wearable device. The method may include S101 to S103 described below.

S101: The first device acquires the configuration information of the first device, the configuration information including K characters.

Where K is a positive integer. The configuration information of the first device can be used for indicating the identity of the first device.

In some embodiments, the above configuration information may be static configuration information. For example, the static configuration information may be factory-configured for the first device or pre-configured for a Subscriber Identity Module (SIM) card of the first device. In some embodiments, the above configuration information may be dynamic configuration information. For example, when register, attach, inter-RAT cell reselection, inter-RAT handover, and registration update occur for each first device, a network device can assign the configuration information to the first device through a downlink message (such as a system message).

In some embodiments, the configuration information of the first device may include at least one of: an MAC address; an International Mobile Equipment Identity (IMEI); an Integrate Circuit Card Identity (ICCID); a Mobile Equipment Identifier (MEID); an International Mobile Subscriber Identification number (IMSI); a 5G S-Temporary Mobile Subscription Identifier (5G-S-TMSI); and a Full Inactive-Radio Network Temporary Identifier (FulII-RNTI). Of course, the configuration information of the first device may also be any other information used for indicating the identity of the first device, which will not be limited in the embodiments of the present application.

In some embodiments, the configuration information of the first device may be stored in the first device, or in the network device where the first device resides in a network, or stored in a cloud server, which will not be limited in the embodiments of the present application.

In some embodiments, the above K characters may include T strings. Each of the T strings may include at least one character, that is, all characters of the T strings may be combined into the K characters. The T strings may be binary, quaternary, senary, octal, decimal, hexadecimal, duotricemary, base-64 or other possible bases. T is a positive integer.

Exemplarily, suppose that the MAC address of the first device is hexadecimal A8-9C-ED-7D-CC-9E, wherein first 3 strings A8-9C-ED may be used for indicating a company of the first device, and last 3 strings 7D-CC-9E may be used for indicating a model type of the first device.

In an embodiment of the present application, the configuration information of the first device may be obtained in any of scenarios of:

Scenario 1: The first device receives first input by a user, and acquires the configuration information of the first device in response to the first input. Scenario 2: When the first device meets preset conditions, the configuration information of the first device is automatically acquired. The preset conditions may be that register, attach, inter-RAT cell reselection, inter-RAT handover, registration update or the like occurs for the first device.

S102: For each of the K characters, the first device generates a graphic corresponding to one character according to a primary element corresponding to the character and a secondary element corresponding to the character.

When the K characters include T strings, for each character in each of the T strings, the first device can generate a graphic corresponding to one character according to the primary element corresponding to the character and the secondary element corresponding to the character, to obtain a graphic group corresponding to each string.

In an embodiment of the present application, each of the K characters may correspond to one primary element and one secondary element. The primary element corresponding to one character can be used for defining a body composition of one graphic, that is, the primary graphic body of one graphic, including a shape and size of the primary graphic body. The secondary element corresponding to one character can distinguish different values, that is, the secondary graphic body of one graphic, including the number of secondary graphic bodies and the position of secondary graphic body on the primary graphic body. Generally, the primary element of each character in a string will not change, while the secondary element of each character in the string will change in cycle, but the elements are single. For example, the secondary element can define different values by changes in position and number.

In some embodiments, any one of the K characters can be acquired in the following way:

(a) The first device obtains the primary graphic body of one graphic according to the primary element corresponding to one character.

(b) The first device obtains the secondary graphic body of one graphic according to the secondary element corresponding to one character.

(c) The first device generates a graphic corresponding to one character according to the primary graphic body of the graphic and the secondary graphic body of the graphic.

In order to illustrate the present application more clearly, a schematic diagram of a character and graphic is provided below. As shown in FIG. 2, suppose that the primary element corresponding to the character is an arc, and the secondary element corresponding to the character is the positions and number of dots. Different positions and numbers of the dots can be used for representing different values. For characters 0 to 9, the primary element of each character corresponding to the graphic is the arc, and the secondary elements of each character corresponding to the graphic are the position of the dot and the number of the dots. For example:

The primary element corresponding to character 0 is used for indicating an arc, that is, the primary graphic body is an arc corresponding to character 0 as shown in FIG. 2. The secondary element corresponding to character 0 is used for indicating one dot located at a first endpoint of the arc, that is, the secondary graphic body is one dot located at the first endpoint of the arc.

The primary element corresponding to character 1 is used for indicating an arc, that is, the primary graphic body is an arc corresponding to character 1 as shown in FIG. 2. The secondary element corresponding to character 1 is used for indicating one dot that is ⅓ of an arc length from the first endpoint of the arc, that is, the secondary graphic body is one dot that is ⅓ of the arc length from the first endpoint of the arc.

The primary element corresponding to character 2 is used for indicating an arc, that is, the primary graphic body is an arc corresponding to character 2 as shown in FIG. 2. The secondary element corresponding to character 2 is used for indicating one dot that is ½ of an arc length from the first endpoint of the arc, that is, the secondary graphic body is one dot that is ½ of the arc length from the first endpoint of the arc.

The primary element corresponding to character 3 is used for indicating an arc, that is, the primary graphic body is an arc corresponding to character 3 as shown in FIG. 2. The secondary element corresponding to character 3 is used for indicating one dot located at a second endpoint of the arc, that is, the secondary graphic body is a dot located at the second endpoint of the arc.

The primary element corresponding to character 4 is used for indicating an arc, that is, the primary graphic body is an arc corresponding to character 4 as shown in FIG. 2. The secondary element corresponding to character 4 is used for indicating two dots located at the second endpoint of the arc, that is, the secondary graphic body is two dots located at the second endpoint of the arc.

The primary element corresponding to character 5 is used for indicating an arc, that is, the primary graphic body is an arc corresponding to character 5 as shown in FIG. 2. The secondary element corresponding to character 5 is used for indicating one dot located at the first endpoint of the arc and two dots located at the second endpoint of the arc, that is, the secondary graphic body is one dot located at the first endpoint of the arc and two dots located at the second endpoint of the arc.

The primary element corresponding to character 6 is used for indicating an arc, that is, the primary graphic body is an arc corresponding to character 6 as shown in FIG. 2. The secondary element corresponding to character 6 is used for indicating one dot that is ⅓ of the arc length from the first endpoint of the arc and two dots located at the second endpoint of the arc, that is, the secondary graphic body is one dot that is ⅓ of the arc length from the first endpoint of the arc and two dots located at the second endpoint of the arc.

The primary element corresponding to character 7 is used for indicating an arc, that is, the primary graphic body is an arc corresponding to character 7 as shown in FIGS. 7*a*-7*c*. The secondary element corresponding to character 7 is used for indicating one dot that is ½ of the arc length from the first endpoint of the arc and two dots located at the second endpoint of the arc, that is, the secondary graphic body is one dot that is ½ of the arc length from the first endpoint of the arc and two dots located at the second endpoint of the arc.

The primary element corresponding to character 8 is used for indicating an arc, that is, the primary graphic body is an arc corresponding to character 8 as shown in FIG. 2. The secondary element corresponding to character 8 is used for indicating three dots located at the second endpoint of the arc, that is, the secondary graphic body is three dots located at the second endpoint of the arc.

The primary element corresponding to character 9 is used for indicating an arc, that is, the primary graphic body is an arc corresponding to character 9 as shown in FIG. 2. The secondary element corresponding to character 9 is used for indicating one dot located at the first endpoint of the arc and three dots located at the second endpoint of the arc, that is, the secondary graphic body is one dot located at the first endpoint of the arc and three dots located at the second endpoint of the arc.

It should be noted that the above embodiments are illustrative and do not limit the embodiments of the present application. It can be understood that the above embodiments are illustrated with characters 0 to 9 as an example, or may also be illustrated with any other possible characters. In addition, the primary graphic body of a graphic may also be other graphics in addition to the above arc. The secondary graphic body of a graphic may also be other graphics in addition to the above dot.

S103: The first device arranges K graphics corresponding to the K characters to different regions to generate dynamic images.

The above dynamic image may be used for indicating the configuration information of the first device.

It should be noted that different from a static image (such as a two-dimensional code) displayed by the scanned device in the related art, images generated and displayed by the first device provided in this embodiment of the present application are dynamic images, that is, the first device can switch and display multiple dynamic images at a preset frequency to produce a certain dynamic effect. Each of the multiple dynamic images may be used for indicating the configuration information of the first device, which can improve the diversity of scanning modes.

In some embodiments, when the K characters include the T strings, the T strings correspond to T graphic groups, and each T graphic group corresponds to an arrangement region. The arrangement region corresponding to each graphic group and an arrangement position of each graphic in each graphic group can be determined according to a preset arrangement rule. Therefore, after acquiring the T graphic groups, the first device may arrange each of the T graphic groups to the arrangement region corresponding to each graphic group in a graphic layer according to the preset arrangement rule, to finally obtain a dynamic image.

For example, the image processing method provided by this embodiment of the present application may further include:
(1) The first device converts K initial characters from a first format to a second format, to obtain K target characters, the second format being a preset format.
(2) For each target character of the K target characters, a graphic corresponding to one target character is generated according to a primary element corresponding to the target character and a secondary element corresponding to the target character.
(3) The first device arranges the K graphics corresponding to the K characters to the different regions to generate the dynamic images.

In some embodiments, the K graphics can be arranged to a region where multiple concentric circles are located. Each ring may include a direction identifier (such as an arrow) and at least one graphic. For example, M arcs in each ring can be displayed in whole or in part. As another example, some of the M arcs in each ring are displayed in a first display mode, and other of the M arcs in each ring are displayed in a second display mode. The first display mode and the second display mode may be that the arcs have different colors, the arcs have different line types, or the arcs have different thicknesses.

Exemplarily, FIG. 3 is a schematic diagram of a dynamic image provided by an embodiment of the present application. As shown in FIG. 3, after the first device converts 6 initial strings: A8-9C-ED-7D-CC-9E into 6 target strings: 168-156-237-125-204-158, if the first device acquires 6 graphic groups according to the above embodiment, the first device may first arrange strings 168 and 156 to a first inner ring. Arcs of characters 1, 8 and 5 are represented by solid lines. Arcs of characters 6, 1 and 6 are represented by solid lines. Then, the first device may arrange strings 237 and 125 to a second inner ring. Arcs of characters 2, 7 and 2 are represented by solid lines. Arcs of characters 3, 1 and 5 are represented by solid lines. Then, the first device may first arrange the strings 204 and 158 to a third outer ring, arcs of characters 2, 4 and 5 are represented by dotted lines. Arcs of characters 0, 1 and 8 are represented by solid lines. After these strings are arranged to different positions of the 3 rings, the dynamic images as shown in FIG. 3 can be obtained. Finally, the first device can switch and display multiple dynamic images at a preset frequency. Compared with those of an $i^{th}$ image, multiple concentric circles of an $i+1^{th}$ image all rotate a preset angle, that is, dynamic switching and display of the multiple images can produce a dynamic effect of the multiple concentric circles rotating at a preset angular speed.

An embodiment of the present application provides an image generating method. Since the first device can generate a graphic corresponding to each character according to the primary element and secondary element corresponding to each of the K characters, thereby generating a dynamic image, and then generating multiple dynamic images, the image generation mode can be enriched.

EMBODIMENT II

In a process that the first device displays the dynamic image, a user can make a camera of the second device aimed at the dynamic image to capture the dynamic image. Generally, if the camera of the second device is faced the camera, and the attitude of the first device does not change, then the second device can acquire a front image consistent with the content of the dynamic image, identifies a primary graphic body of a first graphic and a secondary graphic body of the first graphic in the front image, and determines a first character corresponding to the first graphic directly according to the primary graphic body of the first graphic and the secondary graphic body of the first graphic, and then identifies the first device based on the first character. However, in some cases, the first device may shake slightly. For example, the smart watch will shake as the user's arm rotates left and right, or the smart watch will shake as the user's arm moves up and down. Therefore, an angle of an identity image collected by the second device will change, thereby resulting in that the identity image cannot be identified, and therefor identity information of the device cannot be read.

Figure 4:
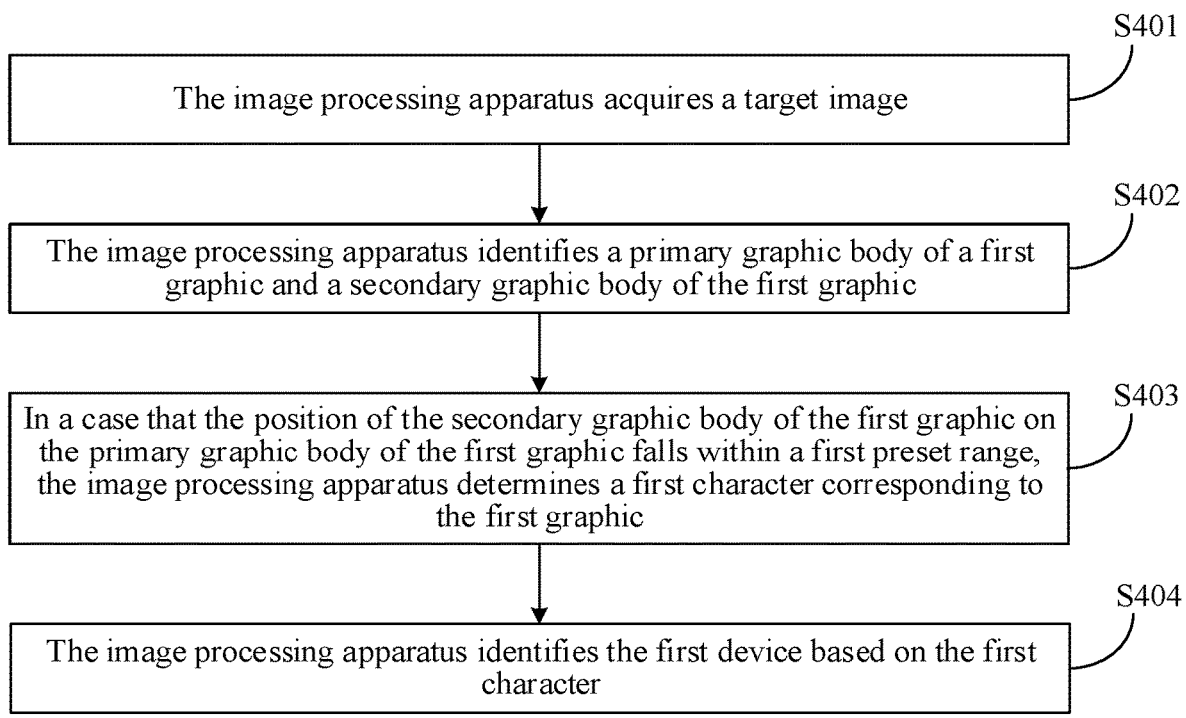
FIG. 4 is a schematic diagram I of an image processing method provided by an embodiment of the present application.

This embodiment of the present application provides an image processing method. As shown in FIG. 4, the method may include S401 to S404 described below. This method is illustrated with taking an execution subject as the image processing apparatus as an example. For example, the image processing apparatus provided by this embodiment of the present application may be the second device in addition to the first device, or a third device in addition to the first device and the second device.

S401: The image processing apparatus acquires the target image.

The above target image can be the image obtained by capturing the dynamic image displayed by the first device by means of the second device. The dynamic image may be used for indicating the configuration information of the first device.

In an embodiment of the present application, when the dynamic image displayed by the first device is captured by the second device, the first device has the first attitude. It should be noted that the first device having the first attitude means that an attitude of the first device relative to the second device is the first attitude. For example, when an optical axis direction of the camera of the second device is perpendicular to a plane where the dynamic image displayed by the first device is located, the camera of the second device is faced the dynamic image. At this time, the first device has an attitude. When the first device shakes relative to the second device, the attitude of the first device changes accordingly, and an included angle between the optical axis direction of the camera of the second device and the plane where the dynamic image displayed by the first device is located decreases. At this time, the first device has another attitude. As the included angle between the optical axis direction of the camera of the second device and the plane where the dynamic image displayed by the first device is located changes, it can be considered that the first device has different attitudes. For the way to determine the attitude of the first device, reference may be made to the description in the embodiment below, which will not be repeated here.

For the description of the first device and the dynamic image, reference may be made to the relevant description of one of the above embodiments.

The above S401 can be implemented in two ways described below.

For a first way, in a case that the image processing apparatus is the second device, the second device captures the dynamic image displayed by the first device by means of the second device to obtain the target image.

For example, the first device is a smart watch, and the second device is a mobile phone. In a case that a display screen of the smart watch displays the dynamic image, the user can make a rear camera of the mobile phone aimed at the display screen of the smart watch. At this time, if the smart watch shakes, the mobile phone can collect the target image with distorted graphics.

For a second way, in a case that the image processing apparatus is the third device, after the dynamic image displayed by the first device is captured by the second device to obtain the target image, the third device receives the target image sent by the second device.

For example, the first device is a smart watch, and the second device is a mobile phone. In a case that a display screen of the smart watch displays the dynamic image, the user can make a rear camera of the mobile phone aimed at the display screen of the smart watch. At this time, if the smart watch shakes, the mobile phone can collect the target image with distorted graphics. After that, the mobile phone can send the target image to a server, so that the server can receive the target image, and identifies the target image.

S402: The image processing apparatus identifies the primary graphic body of the first graphic and the secondary graphic body of the first graphic.

The first graphic is a graphic in the target image.

For the description of the primary graphic body and the secondary graphic body, reference may be made to the relevant description of one of the above embodiments.

In some embodiments, the target image includes at least one image region. Each image region includes a direction identifier and at least one graphic. Each graphic includes a primary graphic body and at least one secondary graphic body. The primary graphic body of each graphic includes the shape and size of the primary graphic body. The secondary graphic body of each graphic includes the number of the secondary graphic bodies and the position of the secondary graphic body on the primary graphic body.

In an embodiment of the present application, the image processing apparatus can store a preset identification algorithm. After acquiring the target image, the image processing apparatus can identify at least one image region of the target image in steps according to the preset identification algorithm. For example, when the target image includes a plurality of image regions, the image processing apparatus can identify the plurality of image regions in sequence in accordance with a preset identification order of the plurality of image regions. For example, the first image region can be a first image region to be identified of the plurality of image regions.

S403: In a case that the position of the secondary graphic body of the first graphic on the primary graphic body of the first graphic falls within the first preset range, the image processing apparatus determines a first character corresponding to the first graphic.

The first preset range corresponds to the first attitude.

Generally, if the camera of the second device is faced the camera, and the attitude of the first device does not change, then after the image processing apparatus identifies the primary graphic body of the first graphic and the secondary graphic body of the first graphic, a primary element of the first graphic can be obtained according to the primary graphic body of the first graphic. Then a secondary element of the first graphic can be obtained according to the secondary graphic body of the first graphic. After that, characters corresponding to the first graphic are determined according to the primary element of the first graphic and the secondary element of the first graphic.

However, in a case that the first device slightly shakes, compared with those of the original dynamic image displayed, shapes of the secondary graphic body and the primary graphic body in the collected target image change slightly, and a relative position relationship between the secondary graphic body and the primary graphic body will change. Taking character 2 shown in FIG. 2 as an example, after the first device slightly shakes, the shape of the arc may change, and the dot may shift from the center of the arc to other positions of the arc. Therefore, the image processing apparatus cannot determine the character corresponding to the first graphic according to the above method. In an embodiment of the present application, multiple preset ranges used for describing the relative position relationship between the secondary graphic body and the primary graphic body under various attitudes are set. The preset ranges corresponding to each attitude are different. Therefore, in a case that the shapes of the secondary graphic body and the primary graphic body slightly change, and the relative position relationship between the secondary graphic body and the primary graphic body slightly change, if the position of the secondary graphic body of the first graphic on the primary graphic body of the first graphic falls within the first preset range corresponding to the first attitude, then the first character corresponding to the first graphic can still be determined according to the primary graphic body and secondary graphic body of the distorted first graphic.

In some embodiments, in a case that the first device is in an attitude, different preset ranges are set for different characters. In a case that the first device is in different attitudes, different preset ranges are set for a same character.

For example, for character 2, when shaking slightly, the first device has the first attitude, and the first preset range corresponding to the first attitude is 42% to 58%. When shaking violently, the first device has a second attitude, and a second preset range corresponding to the second attitude is 40% to 60%.

It can be understood that as the included angle between the optical axis direction of the camera of the second device and the plane where the dynamic image displayed by the first device is located gradually decreases, and the more obvious the tilt of the first device relative to the second device, the more obvious the distortion degree of the image content of the image obtained by the second device capturing the dynamic image displayed by the first device. Therefore, in order to more accurately identify the image content, the range corresponding to the attitude of the first device will also change.

In some embodiments, the above S403 can be implemented by S1 to S3 described below.

S1: In a case that a rotation angle of the first device relative to a first direction is less than or equal to a preset angle, the image processing apparatus acquires projections of the primary graphic body of the first graphic and the secondary graphic body of the first graphic in a second direction.

The second direction is perpendicular to the first direction.

After repeated experiments, it is found that when the rotation angle of the first device relative to the first direction is greater than the preset angle, since the tilt angle of the first device is relatively large, the distortion amount of the image collected by the second device is relatively large, which is beyond an identifiable range. At this time, the projections of the primary graphic body and the secondary graphic body in the second direction cannot be acquired. When the rotation angle of the first device relative to the first direction is less than or equal to the preset angle, since the tilt angle of the first device is relatively small, the distortion amount of the image collected by the second device is relatively small, which falls within the identifiable range. Therefore, the projections of the primary graphic body of the first graphic and the secondary graphic body of the first graphic in the second direction can be acquired.

In some embodiments, the preset angle can be 15°. Of course, it can be understood that when an algorithm employed is different, the identification accuracy of the collected image is different. Therefore, the preset angle can also be other possible angles, which will not be limited by this embodiment of the present application.

Figure 5A:
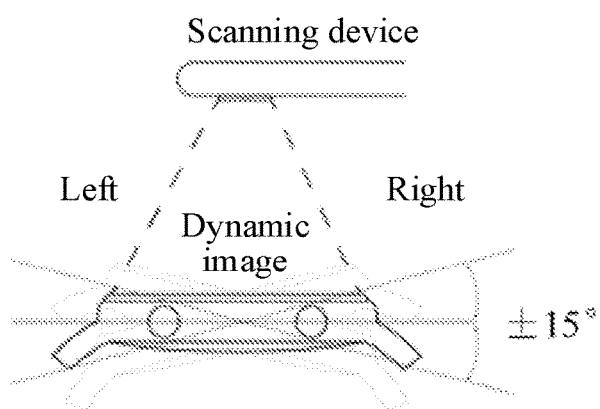
FIGS. 5a-5b each is a schematic diagram I of scanning a dynamic image provided by an embodiment of the present application.
Figure 5B:
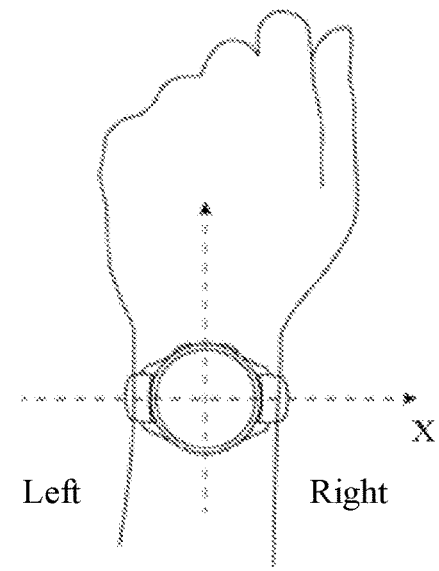

For example, FIG. 5*a* is a side view of the dynamic image, displayed by the smart watch, collected by the scanning device. FIG. 5*b* is a front view of the user wearing the smart watch. When the user rotates his/her arm to the right in a positive direction of the X-axis as shown in FIG. 5*b*, or rotates his/her arm to the left in a negative direction of the X-axis as shown in FIG. 5*b*, if the rotation angle of the smart watch relative to the X-axis direction is less than or equal to 15°, then the image processing apparatus acquires the projections of the primary graphic body of the first graphic and the secondary graphic body of the first graphic in a Y-axis direction. The X-axis direction is perpendicular to the Y-axis direction.

Figure 6A:
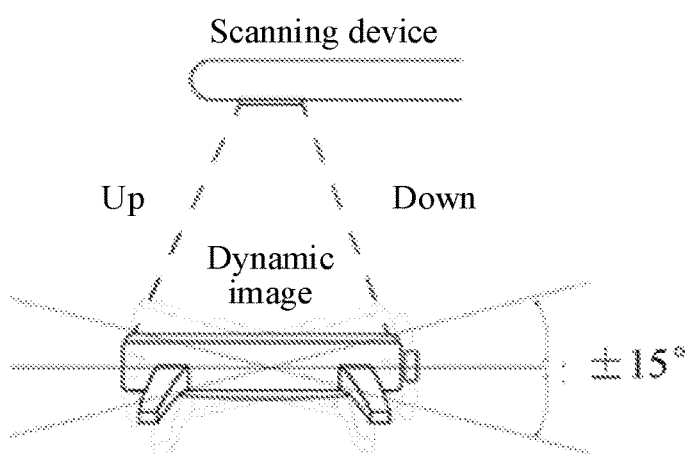
FIGS. 6a-6b each is a schematic diagram II of scanning a dynamic image provided by an embodiment of the present application.
Figure 6B:
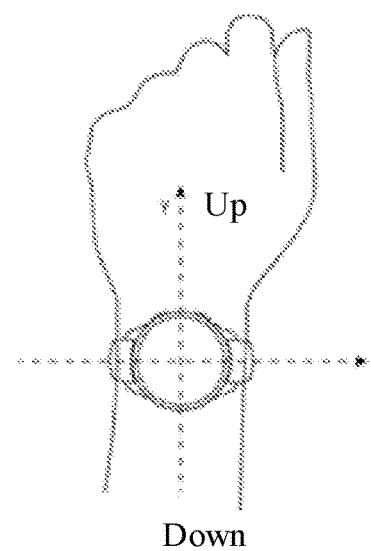

For another example, FIG. 6*a* is a side view of the dynamic image, displayed by the smart watch, collected by the scanning device. FIG. 6*b* is a front view of the user wearing the smart watch. When the user rotates his/her arm upward in a positive direction of the Y-axis as shown in FIG. 6*b*, or rotates his/her arm downward in a negative direction of the Y-axis as shown in FIG. 6*b*, if the rotation angle of the smart watch relative to the Y-axis direction is less than or equal to 15°, then the image processing apparatus acquires the projections of the primary graphic body of the first graphic and the secondary graphic body of the first graphic in the X-axis direction. The X-axis direction is perpendicular to the Y-axis direction.

S2: The image processing apparatus determines a first ratio according to the projections of the primary graphic body of the first graphic and the secondary graphic body of the first graphic in the second direction.

Exemplarily, it is illustrated in combination with the rotation mode shown in FIGS. 5*a*-5*b* above. As shown in FIG. 7*a*, in a case that the first device does not change its attitude, the second device collects the front image of the dynamic image. The first graphic in the front image includes: an arc-shaped primary graphic body, and a dot located between a first endpoint A1 and a second endpoint B1 of the primary graphic body. Therefore, a character corresponding to the first graphic is 2. When the user rotates his/her arm to the right in the positive direction of the X-axis as shown in FIG. 5*b*, if the rotation angle of the smart watch relative to the X-axis direction is less than or equal to 15°, then as shown in FIG. 7*b*, the image is the target image collected by the scanning device in a case that the first device changes its attitude. The target image is an image obtained by perspective when the front image tilts.

S3: In a case that the first ratio falls within the first preset range, the image processing apparatus determines a target graphic after image correction of the first graphic, and determines the first character corresponding to the target graphic according to a preset graphic and character correspondence rule.

In some embodiments, the above preset graphic and character correspondence rule may be a correspondence rule as shown in FIG. 2.

Figure 8:
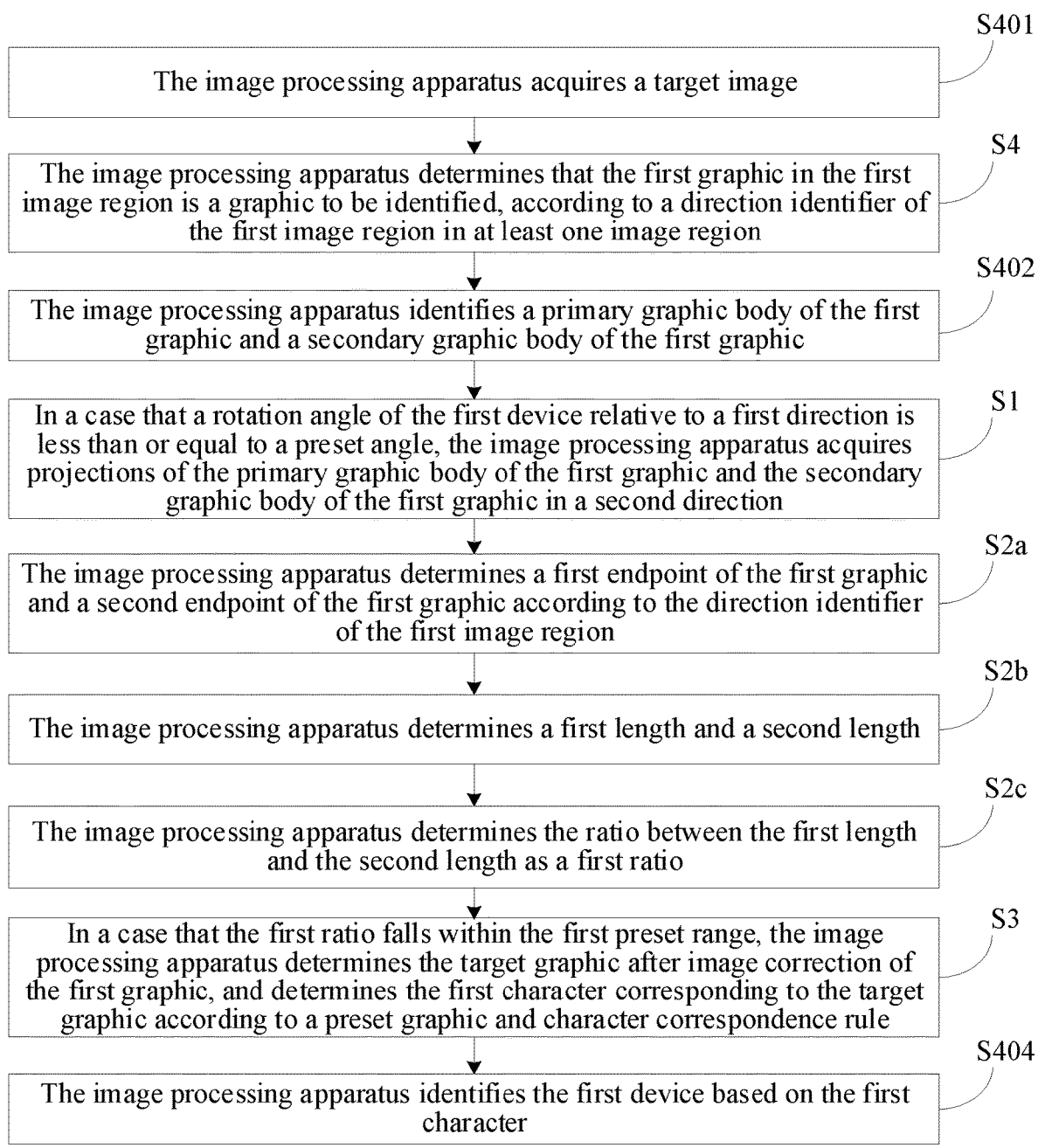
FIG. 8 is a schematic diagram II of an image processing method provided by an embodiment of the present application.

In some embodiments, the target image may include at least one image region. Each image region may include a direction identifier and at least one graphic. Each graphic may include a primary graphic body and at least one secondary graphic body. Exemplarily, in combination with FIG. 4, as shown in FIG. 8, before the above S402, the image processing method provided by this embodiment of the present application may further include S4 described below, and the above S2 can be implemented by S2*a* to S2*c* described below.

S4: The image processing apparatus determines that the first graphic in the first image region is a graphic to be identified, according to the direction identifier of the first image region in at least one image region.

S2*a*: The image processing apparatus determines a first endpoint of the first graphic and a second endpoint of the first graphic according to the direction identifier of the first image region.

S2*b*: The image processing apparatus determines a first length and a second length. The first length is a length between projections of the first endpoint and the secondary graphic body of the first graphic in the second direction. The second length is a length between projections of the first endpoint and the second endpoint in the second direction.

S2*c*: The image processing apparatus determines the ratio between the first length and the second length as the first ratio.

Exemplarily, it is still illustrated with the above FIGS. 7*a*-7*b* as an example. FIG. 7*c* is an enlarged view of the first graphic as shown in FIG. 7*b*. As shown in FIG. 7*c*, a projection of the first endpoint A1 of the primary graphic body in the Y-axis direction is A2, and a projection of the second endpoint B1 of the primary graphic body in the Y-axis direction is B2. In a case that the first device changes its attitude, since the collected first graphic produces a certain amount of image distortion, the dot will move slightly relative to midpoints of the first endpoint A1 and the second endpoint A2. In an embodiment of the present application, a preset range is set for character 2, that is, 42% to 58%. When the ratio of a projection length of the dot in the Y-axis direction (that is, a length from the projection of the dot to a point A2) and a length between projections of the first endpoint A1 and the second endpoint B1 in the second direction (that is, a length from the point A2 to a point B2) falls within this range of 42% to 58% (that is, an arc segment of the dot located between C2 and D2), it can be determined that the target graphic after image correction of the first graphic shown in FIG. 7c is a graphic corresponding to character 2 as shown in FIG. 2, and then character 2 can be determined.

It should be noted that the above embodiment is illustrated with setting the first preset range for character 2 as an example. It can be understood that different preset ranges can be set for different characters according to actual use needs. For example, for character 1 as shown in FIG. 2, the second preset range can be set as 25% to 41%. At this time, for a case that one graphic includes an arc and a dot, if a projection ratio falls within the first preset range, then character 2 is determined, while if a projection ratio falls within the second preset range, then character 1 is determined. Since different preset ranges are set for different characters in a case that the first device has an attitude, it is possible to distinguish different characters.

S404: The image processing apparatus identifies the first device based on the first character.

For example, after S403 and before S404, the image processing method provided by this embodiment of the present application may further include: converting the first character from the second format to the first format to obtain a third character. Accordingly, the above S404 may include: the first device identifies the first device based on the third character.

In an image processing method provided by an embodiment of the present application, in a case that the first device displays the dynamic image, although the angle of the target image obtained by capturing the dynamic image by the second device will change with the change of the attitude of the first device, when the position of the secondary graphic body of the first graphic in the target image on the primary graphic body falls within the first preset range corresponding to the first attitude, the first character corresponding to the first graphic can still be determined, and the first device is identified based on the first character. Therefore, the identity of the scanned device can be identified by the method in a case that the scanned device shakes.

In some embodiments, after the above S404, a first possible case is that identification of the first device based on the first character succeeds, and therefore, it is possible to stop identifying other graphics in the target image, and a wireless connection is established between the first device and the second device. A second possible case is that identification of the first device based on the first character fails, and at this time, it is necessary to further identify other graphics in the target image. For the second possible case, the image processing method provided by this embodiment of the present application may further include S405 to S407 described below.

S405: In a case that identification of the first device based on the first character fails, the image processing apparatus identifies a primary graphic body of a second graphic and a secondary graphic body of the second graphic.

The second graphic is a graphic in addition to the first graphic in the target image, that is, the second graphic is different from the first graphic.

In some embodiments, the above "identifying the primary graphic body of the second graphic and the secondary graphic body of the second graphic" may include: identifying the primary graphic body of the second graphic and the secondary graphic body of the second graphic in the second image region in the at least one image region.

S406: In a case that the position of the secondary graphic body of the second graphic on the primary graphic body of the second graphic falls within the second preset range, the image processing apparatus determines a second character corresponding to the second graphic.

The second preset range corresponds to the first attitude.

S407: The image processing apparatus identifies the first device based on the first character and the second character.

For the descriptions of the above S405 to S407, reference may be made to the relevant descriptions of S402 to S404 in the above embodiments, which will not be repeated here.

Suppose that the Mac address of the first device is the hexadecimal A8-9C-ED-7D-CC-9E, the string A8-9C-ED is a company identity, and the string 7D-CC-9E is a device identity. In a case that identification of the first device based on the first string 168 and the second string 156 fails, the image processing apparatus may further identify a third image region in the at least one image region, for example, regions corresponding to points 4 to 6, to obtain a third graphic group. Then, the image processing apparatus determines a character corresponding to each graphic in the third graphic group, thereby obtaining the string 237. After that, the image processing apparatus identifies the first device based on strings 168-156-237, or the first device based on the base-converted strings A8-9C-ED. If the company identity of the first device is identified based on the strings 168-156-237 or the strings A8-9C-ED, then the image processing apparatus can display company information of the first device on a screen, that is, the company identification of the first device succeeds. If the user intends to know specific situations of the first device, the image processing apparatus can be triggered to further identify the target image. Otherwise, image identification is stopped.

In the image processing method provided by the embodiment of the present disclosure, the image processing apparatus identifies the graphics in the dynamic image displayed by the first device in steps. Therefore, in a case that the identified information does not meet the requirements, the next step of graphic identification can be continued, while in a case that the identified information meets the requirements, the graphic identification can be stopped, so that this identification method is more flexible and more energy-saving.

It should be noted that in the image processing method provided by this embodiment of the present application, the execution subject may be an image processing apparatus, or a control module for executing the image processing method in the image processing apparatus. In this embodiment of the present application, the image processing apparatus provided by this embodiment of the present application is illustrated with taking the image processing apparatus executing the image processing method as an example.

Figure 9:
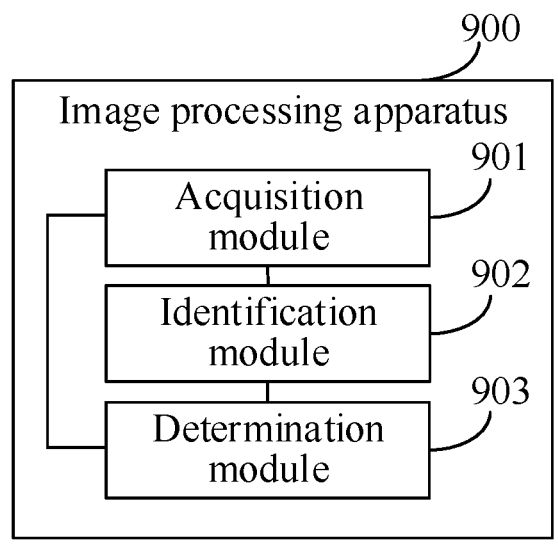
FIG. 9 is a structural schematic diagram of an image processing apparatus provided by an embodiment of the present application.

As shown in FIG. 9, an embodiment of the present application provides an image processing apparatus 900.

The image processing apparatus includes an acquisition module 901, an identification module 902 and a determination module 903.

The acquisition module 901 may be configured to acquire a target image, the target image being an image obtained by capturing a dynamic image displayed by a first device by means of the second device, the dynamic image being used for indicating configuration information of the first device, and the first device having a first attitude. The identification module 902 may be configured to identify a primary graphic body of a first graphic and a secondary graphic body of the first graphic, the first graphic being a graphic in the target image acquired by the acquisition module 901. The determination module 903 may be configured to determine a first character corresponding to the first graphic, in a case that a position of the secondary graphic body of the first graphic on the primary graphic body of the first graphic falls within a first preset range, the first preset range corresponding to the first attitude. The identification module 902 may be further configured to identify the first device based on the first character determined by the determination module 903.

In some embodiments, the identification module 902 may be further configured to identify a primary graphic body of a second graphic and a secondary graphic body of the second graphic, in a case that identification of the first device based on the first character fails, the second graphic being another graphic in the target image. The determination module 903 may be further configured to determine a second character corresponding to the second graphic, in a case that a position of the secondary graphic body of the second graphic on the primary graphic body of the second graphic falls within the second preset range, the second preset range corresponding to the first attitude. The identification module 902 may be further configured to identify the first device based on the first character and the second character.

In some embodiments, the determination module 903 may be configured to acquire the projections of the primary graphic body of the first graphic and the secondary graphic body of the first graphic in the second direction, in a case that the rotation angle of the first device relative to the first direction is less than or equal to the preset angle, the second direction being perpendicular to the first direction; determine the first ratio according to the projections of the primary graphic body of the first graphic and the secondary graphic body of the first graphic in the second direction; and in a case that the first ratio falls within the first preset range, determine the target image after image correction of the first graphic, and determine the first character corresponding to the target graphic according to the preset graphic and character correspondence rule.

In some embodiments, the target image includes at least one image region. Each image region includes a direction identifier and at least one graphic. Each graphic includes a primary graphic body and at least one secondary graphic body. The determination module 903 may be further configured to determine that the first graphic in the first image region is the graphic to be identified, according to the direction identifier of the first image region in the at least one image region before identifying the primary graphic body of the first graphic and the secondary graphic body of the first graphic.

In some embodiments, the determination module 903 may be configured to determine the first endpoint of the first graphic and the second endpoint of the first graphic according to the direction identifier of the first image region; determine the first length and the second length; and determine the ratio between the first length and the second length as the first ratio. The first length is a length between projections of the first endpoint and the secondary graphic body of the first graphic in the second direction. The second length is a length between projections of the first endpoint and the second endpoint in the second direction.

In some embodiments, the acquisition module 901 may be configured to capture the dynamic image to obtain the target image. In some alternative embodiments, the acquisition module 901 may be configured to receive the target image sent by the second device, after capturing the dynamic image by means of the second device to obtain the target image.

In an image processing apparatus provided by an embodiment of the present application, in a case that the first device displays the dynamic image, although the angle of the target image obtained by capturing the dynamic image by the second device will change with the change of the attitude of the first device, when the position of the secondary graphic body of the first graphic in the target image on the primary graphic body falls within the first preset range corresponding to the first attitude, the apparatus still can determine the first character corresponding to the first graphic, and identifies the first device based on the first character. Therefore, the apparatus can identify the identity of the scanned device in a case that the scanned device shakes.

The image processing apparatus in this embodiment of the present application may be an apparatus, or a component, integrated circuit, or chip in a terminal. The apparatus may be a mobile electronic device or a non-mobile electronic device. Exemplarily, the mobile electronic device may be a mobile phone, a tablet computer, a laptop, a hand-held computer, a vehicle-mounted electronic device, a wearable device, an Ultra-Mobile Personal Computer (UMPC), a netbook or Personal Digital Assistant (PDA), and the like. The non-mobile electronic device may be a server, a Network Attached Storage (NAS), a Personal Computer (PC), a Television (TV), a teller machine or self-service machine, and the like, which will not be specifically limited in this embodiment of the present application.

The image processing apparatus in this embodiment of the present application may be a device with an operating system. The operating system may be an Android operating system, iOS operating system, or other possible operating systems, which will not be specifically limited in this embodiment of the present application.

The image processing apparatus provided by this embodiment of the present application can implement various processes implemented by the method embodiments of FIGS. 4 to 8. In order to avoid repetition, it will not be repeated here.

Figure 10:
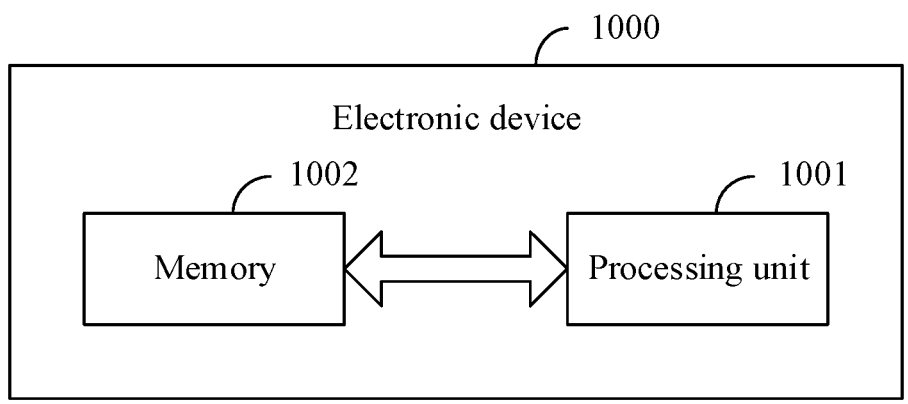
FIG. 10 is a hardware schematic diagram I of an electronic device provided by an embodiment of the present application.

For example, as shown in FIG. 10, an embodiment of the present application provides an electronic device 1000, including a processor 1001, a memory 1002 and a program or instruction stored on the memory 1002 and executable on the processor 1001. When the program or instruction is executed by the processor 1001, each process of the above image processing method embodiment is realized, and a same technical effect can be achieved. In order to avoid repetition, it will not be repeated here.

It should be noted that the electronic device in this embodiment of the present application includes the mobile electronic device and non-mobile electronic device mentioned above.

Figure 11:
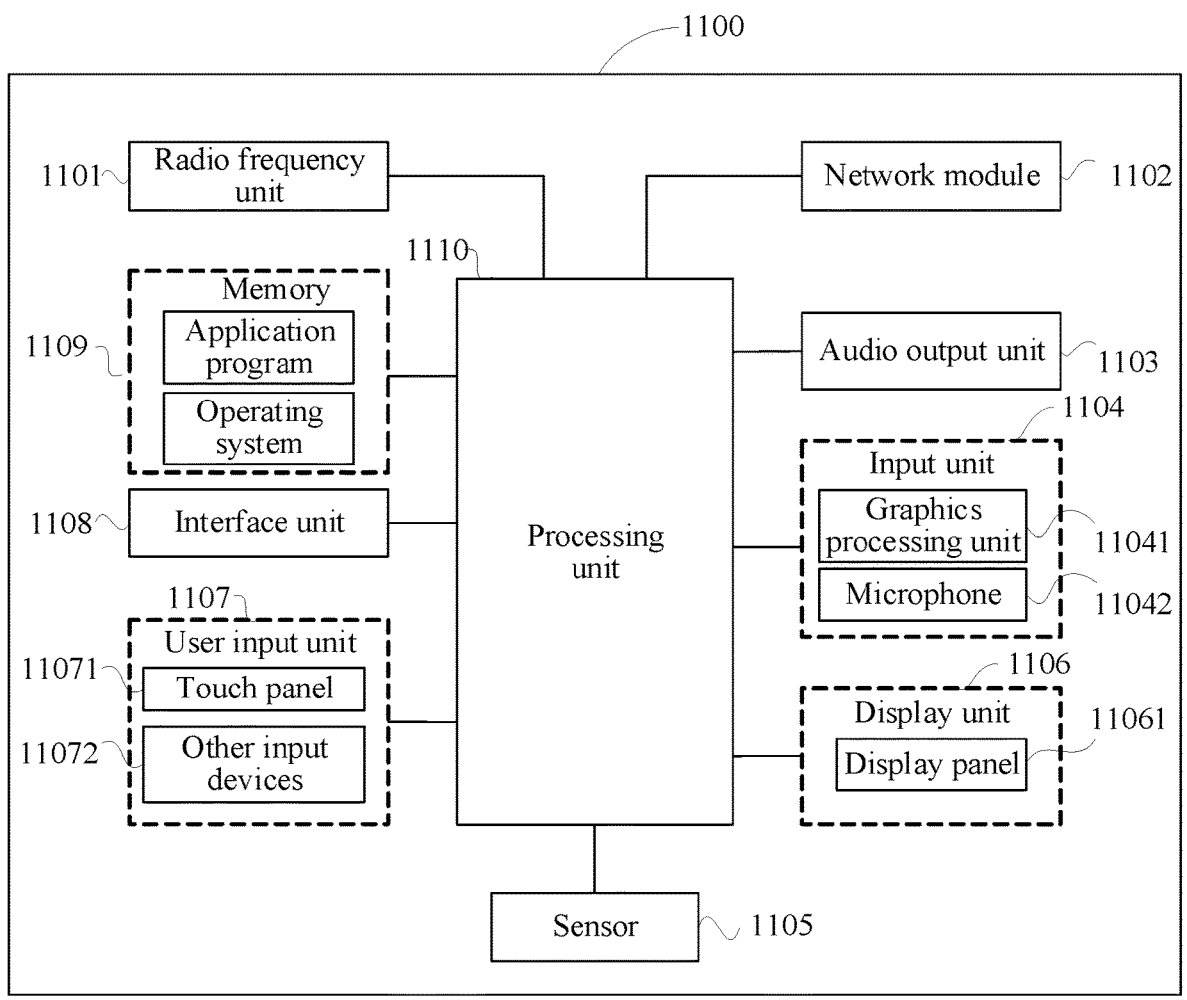
FIG. 11 is a hardware schematic diagram II of an electronic device provided by an embodiment of the present application.

FIG. 11 is a schematic diagram of a hardware structure of an electronic device to implement an embodiment of the present application.

The electronic device 1100 includes, but is not limited to: a radio frequency unit 1101, a network module 1102, an audio output unit 1103, an input unit 1104, a sensor 1105, a display unit 1106, a user input unit 1107, an interface unit 1108, the memory 1109, the processor 1110 and other components.

Those skilled in the art can understand that the electronic device 1100 may also include a power supply (such as a battery) that supplies power to various components. The power supply may be logically connected to the processor 1110 by means of a power management system, thereby implementing functions of managing charging, discharging, and power management by means of the power management system. The structure of the electronic device shown in FIG. 11 does not constitute a limit to the electronic device. The electronic device may include more or fewer parts than shown, or a combination of certain components, or a different arrangement of components, which will not be repeated here.

The processor 1110 may be configured to acquire a target image, the target image being an image obtained by capturing a dynamic image displayed by a first device by means of the second device, the dynamic image being used for indicating configuration information of the first device, and the first device having a first attitude. The processor 1110 may be further configured to identify the primary graphic body of the first graphic and the secondary graphic body of the first graphic, and determine the first character corresponding to the first graphic, in a case that the position of the secondary graphic body of the first graphic on the primary graphic body of the first graphic falls within the first preset range, and identify the first device based on the first character, wherein the first preset range corresponds to the first attitude, and the first graphic is a graphic in the target image.

In some embodiments, the processor 1110 may be further configured to identify the primary graphic body of the second graphic and the secondary graphic body of the second graphic, in a case that identification of the first device based on the first character fails, and determine the second character corresponding to the second graphic, in a case that the position of the secondary graphic body of the second graphic on the primary graphic body of the second graphic falls within the second preset range, and identify the first device based on the first character and the second character, wherein the second graphic is another graphic in the target image. The second preset range corresponds to the first attitude.

In some embodiments, the processor 1110 may be configured to acquire the projections of the primary graphic body of the first graphic and the secondary graphic body of the first graphic in the second direction, in a case that the rotation angle of the first device relative to the first direction is less than or equal to the preset angle, the second direction being perpendicular to the first direction; determine the first ratio according to the projections of the primary graphic body of the first graphic and the secondary graphic body of the first graphic in the second direction; and in a case that the first ratio falls within the first preset range, determine the target image after image correction of the first graphic, and determine the first character corresponding to the target graphic according to the preset graphic and character correspondence rule.

In some embodiments, the target image includes at least one image region. Each image region includes a direction identifier and at least one graphic. Each graphic includes a primary graphic body and at least one secondary graphic body. The processor 1110 may be further configured to determine that the first graphic in a first image region is a graphic to be identified, according to the direction identifier of the first image region in at least one image region before identifying the primary graphic body of the first graphic and the secondary graphic body of the first graphic.

In some embodiments, the processor 1110 may be configured to determine the first endpoint of the first graphic and the second endpoint of the first graphic according to the direction identifier of the first image region; determine the first length and the second length; and determine the ratio between the first length and the second length as the first ratio. The first length is a length between projections of the first endpoint and the secondary graphic body of the first graphic in the second direction. The second length is a length between projections of the first endpoint and the second endpoint in the second direction.

In some embodiments, the processor 1110 may be configured to capture the dynamic image by means of the input unit 1104 to obtain the target image. In some alternative embodiments, the processor 1110 may be configured to receive the target image, sent by the second device, by means of the radio frequency unit 1101 after capturing the dynamic image by means of the second device to obtain the target image.

In an electronic device provided by an embodiment of the present application, in a case that the first device displays the dynamic image, although the angle of the target image obtained by capturing the dynamic image by the second device will change with the change of the attitude of the first device, when the position of the secondary graphic body of the first graphic in the target image on the primary graphic body falls within the first preset range corresponding to the first attitude, the electronic device still can determine the first character corresponding to the first graphic, and identifies the first device based on the first character. Therefore, the electronic device can identify the identity of the scanned device in a case that the scanned device shakes.

It should be understood that in this embodiment of the present application, the input unit 1104 may include a Graphics Processing Unit (GPU) 11041 and a microphone 11042, and the GPU 11041 processes image data of a static picture or video obtained by an image capturing apparatus (such as a camera) in a video capture mode or image capture mode. The display unit 1106 may include a display panel 11061, which can be configured in the form of a liquid crystal display, an organic light emitting diode, and the like. The user input unit 1107 includes a touch panel 11071 and other input devices 11072. The touch panel 11071 is also referred to as a touch screen. The touch panel 11071 may include two parts: a touch detecting apparatus and a touch controller. Other input devices 11072 may include, but are not limited to, a physical keyboard, function keys (such as volume control keys and switch keys), a trackball, a mouse, and a joystick, which will not be repeated here. The memory 1109 may be configured to store software programs and various types of data, including, but not limited to application programs and operating systems. The processor 1110 can integrate an application processor and a modem processor, wherein the application processor mainly processes the operating system, a user interface, the application program and the like. The modem processor mainly processes wireless communications. It can be understood that the above modem processor may also not be integrated into the processor 1110.

An embodiment of the present application further provides a readable storage medium on which a program or instruction is stored. When the program or instruction is executed by the processor, various processes of the above image processing method embodiment are implemented, and a same technical effect can be achieved. In order to avoid repetition, it will not be repeated here.

The processor is a processor in the electronic device in the above embodiment. The readable storage medium includes a computer-readable storage medium, such as a computer Read-Only Memory (ROM), a Random Access Memory (RAM), a magnetic disk or optical disk.

An embodiment of the present application further provides a chip, the chip including a processor and a communication interface. The communication interface is coupled with the processor. The processor is configured to run programs or instructions to implement the various processes of the above image processing method embodiment, and a same technical effect can be achieved. In order to avoid repetition, it will not be repeated here.

It should be understood that the chip provided in this embodiment of the present application may also be referred to as a system-level chip, a system chip, a chip system or a system on chip.

It should be noted that as used herein, the terms "include", "comprise" or any other variants thereof are intended to cover non-exclusive inclusion, so that a process, method, article or apparatus including a series of elements includes not only those elements, but also other elements not explicitly listed, or further includes elements inherent in such process, method, article or apparatus. Without further restrictions, the element defined by the statement "including a" does not exclude the existence of another identical element in the process, method, article or apparatus that includes the element. In addition, it should be pointed out that the scope of the methods and apparatus in the implementation of the present application is not limited to performing the functions in the order shown or discussed, and may also include performing functions in a substantially simultaneous manner or in reverse order according to the functions involved. For example, the described methods may be performed in a different order than described, and various steps may also be added, omitted, or combined. In addition, features described with reference to some examples may be combined in other examples.

Through the descriptions of the above implementations, those skilled in the art can clearly understand that the above embodiments can be implemented by means of software plus a necessary general hardware platform, and of course, may also be implemented by means of hardware. However, in many cases the former is the better implementation. Based on this understanding, the present application, or the part that contributes to the prior art, can be embodied in the form of a software product, the computer software product being stored in a storage medium (such as ROM/RAM, a magnetic disk and an optical disk), which includes several instructions to enable a terminal (which may be a mobile phone, a computer, a server, an air conditioner, or a network device) to execute the methods of various embodiments of the present application.

The embodiments of the present application are described above in combination with the accompanying drawings, but the present application is not limited to the specific implementations described above. The specific implementations described above are only schematic, and not restrictive. Under the enlightenment of the present application, those of ordinary skill in the art can also make many forms without departing from the scope protected by the purpose and claims of the present application, all of which fall within the scope of protection of the present application.

What is claimed is:

1. An image processing method, comprising:
acquiring, by an image processing apparatus, a target image, wherein the target image is an image obtained, by a camera of a second device, by capturing a dynamic image displayed on a first device, wherein the dynamic image is used for indicating configuration information of the first device and the first device has an attitude relative to the second device when the second device captures the dynamic image displayed on the first device,
wherein the attitude of the first device is determined by an included angle between an optical axis direction of the camera of the second device and a plane where the dynamic image displayed on the first device is located;
identifying, by the image processing apparatus, a primary graphic body of a first graphic and a secondary graphic body of the first graphic, wherein the first graphic is a graphic in the target image;
determining, by the image processing apparatus, a first character corresponding to the first graphic, wherein when a position of the secondary graphic body of the first graphic on the primary graphic body of the first graphic falls within a first preset range, the first preset range corresponds to a first attitude; and
identifying, by the image processing apparatus the first device based on the first character for the second device to establish a wireless connection with the first device, wherein the image processing apparatus is part of the second device or a third device.

2. The image processing method according to claim 1, wherein after identifying the first device based on the first character, the method further comprises:
identifying, by the image processing apparatus, a primary graphic body of a second graphic and a secondary graphic body of the second graphic, wherein in response to identification of the first device based on the first character fails, the second graphic is a graphic in addition to the first graphic in the target image;
determining, by the image processing apparatus, a second character corresponding to the second graphic, wherein when a position of the secondary graphic body of the second graphic on the primary graphic body of the second graphic falls within a second preset range, the second preset range corresponds to the first attitude; and
identifying, by the image processing apparatus, the first device based on the first character and the second character for the second device to establish the wireless connection with the first device.

3. The image processing method according to claim 1, wherein determining the first character corresponding to the first graphic comprises:
acquiring, by the image processing apparatus, projections of the primary graphic body of the first graphic and the secondary graphic body of the first graphic in a second direction, wherein when a rotation angle of the first device relative to a first direction is less than or equal to a preset angle, the second direction is perpendicular to the first direction;
determining, by the image processing apparatus, a first ratio according to the projections of the primary graphic body of the first graphic and the secondary graphic body of the first graphic in the second direction; and
when the first ratio falls within the first preset range, determining, by the image processing apparatus, a target graphic after image correction of the first graphic, and determining, by the image processing apparatus, the first character corresponding to the target graphic according to a preset graphic and character correspondence rule.

4. The image processing method according to claim 3, wherein:
the target image comprises at least one image region, wherein each image region comprises a direction identifier and at least one graphic, wherein each graphic comprises a primary graphic body and at least one secondary graphic body;
before identifying, by the image processing apparatus, the primary graphic body of the first graphic and the secondary graphic body of the first graphic, the method further comprises: determining, by the image processing apparatus, that the first graphic in the first image region is a graphic to be identified, according to the direction identifier of the first image region in the at least one image region; and
determining, by the image processing apparatus, the first ratio according to the projections of the primary graphic body of the first graphic and the secondary graphic body of the first graphic in the second direction comprises:
determining, by the image processing apparatus, a first endpoint of the first graphic and a second endpoint of the first graphic according to the direction identifier of the first image region,
determining, by the image processing apparatus, a first length and a second length, wherein the first length is a length between projections of the first endpoint and the secondary graphic body of the first graphic in the second direction, and the second length is a length between projections of the first endpoint and the second endpoint in the second direction, and
determining, by the image processing apparatus, the ratio between the first length and the second length as the first ratio.

5. The image processing method according to claim 1, wherein acquiring the target image comprises:
capturing, by the camera of the second device, the dynamic image to obtain the target image; and
receiving, by the image processing apparatus, the target image sent by the second device, after capturing the dynamic image by the camera of the second device to obtain the target image.

6. An image processing apparatus, comprising a processor; a memory having a computer program or instruction stored thereon, wherein the computer program or instruction, when executed by the processor, causes the processor to perform operations, comprising:
acquiring a target image, wherein the target image is an image obtained, by a camera of a second device, by capturing a dynamic image displayed on a first device, wherein the dynamic image is used for indicating configuration information of the first device and the first device has an attitude relative to the second device when the camera of the second device captures the dynamic image displayed on the first device,
wherein the attitude of the first device is determined by an included angle between an optical axis direction of the camera of the second device and a plane where the dynamic image displayed on the first device is located;
identifying a primary graphic body of a first graphic and a secondary graphic body of the first graphic, wherein the first graphic is a graphic in the target image;
determining a first character corresponding to the first graphic, wherein when a position of the secondary graphic body of the first graphic on the primary graphic body of the first graphic falls within a first preset range, the first preset range corresponds to a first attitude; and
identifying the first device based on the first character for the second device to establish a wireless connection with the first device, wherein the image processing apparatus is part of the second device or a third device.

7. The image processing apparatus according to claim 6, wherein after identifying the first device based on the first character, the method further comprises:
identifying a primary graphic body of a second graphic and a secondary graphic body of the second graphic, wherein in response to identification of the first device based on the first character fails, the second graphic is a graphic in addition to the first graphic in the target image;
determining a second character corresponding to the second graphic, wherein when a position of the secondary graphic body of the second graphic on the primary graphic body of the second graphic falls within a second preset range, the second preset range corresponds to the first attitude; and
identifying the first device based on the first character and the second character for the second device to establish the wireless connection with the first device.

8. The image processing apparatus according to claim 6, wherein determining the first character corresponding to the first graphic comprises:
acquiring projections of the primary graphic body of the first graphic and the secondary graphic body of the first graphic in a second direction, wherein when a rotation angle of the first device relative to a first direction is less than or equal to a preset angle, the second direction is perpendicular to the first direction;
determining a first ratio according to the projections of the primary graphic body of the first graphic and the secondary graphic body of the first graphic in the second direction; and
when the first ratio falls within the first preset range, determining a target graphic after image correction of the first graphic, and determining the first character corresponding to the target graphic according to a preset graphic and character correspondence rule.

9. The image processing apparatus according to claim 8, wherein:
the target image comprises at least one image region, wherein each image region comprises a direction identifier and at least one graphic, wherein each graphic comprises a primary graphic body and at least one secondary graphic body;
before identifying the primary graphic body of the first graphic and the secondary graphic body of the first graphic, the method further comprises: determining that the first graphic in the first image region is a graphic to be identified, according to the direction identifier of the first image region in the at least one image region; and
determining the first ratio according to the projections of the primary graphic body of the first graphic and the secondary graphic body of the first graphic in the second direction comprises:
determining a first endpoint of the first graphic and a second endpoint of the first graphic according to the direction identifier of the first image region, determining a first length and a second length, wherein the first length is a length between projections of the first endpoint and the secondary graphic body of the first graphic in the second direction, and the second length is a length between projections of the first endpoint and the second endpoint in the second direction, and determining the ratio between the first length and the second length as the first ratio.

10. The image processing apparatus according to claim 6, wherein acquiring the target image comprises:

capturing, by the camera of the second device, the dynamic image to obtain the target image; and receiving the target image sent by the second device, after capturing the dynamic image by the camera of the second device to obtain the target image.

11. A non-transitory computer-readable storage medium storing instructions that, when executed by a processor, cause the processor to perform operations comprising:

acquiring a target image, wherein the target image is an image obtained, by a camera of a second device, by capturing a dynamic image displayed on a first device, wherein the dynamic image is used for indicating configuration information of the first device and the first device has an attitude relative to the second device when the second device captures the dynamic image displayed on the first device, wherein the attitude of the first device is determined by an included angle between an optical axis direction of the camera of the second device and a plane where the dynamic image displayed on the first device is located;

identifying a primary graphic body of a first graphic and a secondary graphic body of the first graphic, wherein the first graphic is a graphic in the target image;

determining a first character corresponding to the first graphic, wherein when a position of the secondary graphic body of the first graphic on the primary graphic body of the first graphic falls within a first preset range, the first preset range corresponds to a first attitude; and identifying the first device based on the first character for the second device to establish a wireless connection with the first device, wherein the processor is part of the second device or a third device.

12. The non-transitory computer-readable storage medium according to claim 11, wherein after identifying the first device based on the first character, the operations further comprise:

identifying a primary graphic body of a second graphic and a secondary graphic body of the second graphic, wherein in response to identification of the first device based on the first character fails, the second graphic is a graphic in addition to the first graphic in the target image;

determining a second character corresponding to the second graphic, wherein when a position of the secondary graphic body of the second graphic on the primary graphic body of the second graphic falls within a second preset range, the second preset range corresponds to the first attitude; and identifying the first device based on the first character and the second character for the second device to establish the wireless connection with the first device.

13. The non-transitory computer-readable storage medium according to claim 11, wherein determining the first character corresponding to the first graphic comprises:

acquiring projections of the primary graphic body of the first graphic and the secondary graphic body of the first graphic in a second direction, wherein when a rotation angle of the first device relative to a first direction is less than or equal to a preset angle, the second direction is perpendicular to the first direction;

determining a first ratio according to the projections of the primary graphic body of the first graphic and the secondary graphic body of the first graphic in the second direction; and when the first ratio falls within the first preset range, determining a target graphic after image correction of the first graphic, and determining the first character corresponding to the target graphic according to a preset graphic and character correspondence rule.

14. The non-transitory computer-readable storage medium according to claim 13, wherein:

the target image comprises at least one image region, wherein each image region comprises a direction identifier and at least one graphic, wherein each graphic comprises a primary graphic body and at least one secondary graphic body;

before identifying the primary graphic body of the first graphic and the secondary graphic body of the first graphic, the operations further comprise: determining that the first graphic in the first image region is a graphic to be identified, according to the direction identifier of the first image region in the at least one image region; and determining the first ratio according to the projections of the primary graphic body of the first graphic and the secondary graphic body of the first graphic in the second direction comprises:

determining a first endpoint of the first graphic and a second endpoint of the first graphic according to the direction identifier of the first image region, determining a first length and a second length, wherein the first length is a length between projections of the first endpoint and the secondary graphic body of the first graphic in the second direction, and the second length is a length between projections of the first endpoint and the second endpoint in the second direction, and determining the ratio between the first length and the second length as the first ratio.

15. The non-transitory computer-readable storage medium according to claim 11, wherein acquiring the target image comprises:

capturing, by the camera of the second device, the dynamic image to obtain the target image; and receiving the target image sent by the second device, after capturing the dynamic image by the camera of the second device to obtain the target image.

* * * * *